United States Patent
Gavisiddappa Kodigenahalli et al.

(10) Patent No.: US 10,620,947 B2
(45) Date of Patent: Apr. 14, 2020

(54) METHOD AND SYSTEM FOR MIGRATING MONOLITHIC ENTERPRISE APPLICATIONS TO MICROSERVICE ARCHITECTURE

(71) Applicant: WIPRO LIMITED, Bangalore (IN)

(72) Inventors: Manjunatha Gavisiddappa Kodigenahalli, Bangalore (IN); Devarshi Vajpayee, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/941,005

(22) Filed: Mar. 30, 2018

(65) Prior Publication Data
US 2019/0250912 A1 Aug. 15, 2019

(30) Foreign Application Priority Data
Feb. 15, 2018 (IN) .............................. 201841005887

(51) Int. Cl.
*G06F 8/76* (2018.01)
*H04L 29/08* (2006.01)
*G06F 8/70* (2018.01)

(52) U.S. Cl.
CPC ................ *G06F 8/76* (2013.01); *H04L 67/10* (2013.01); *G06F 8/70* (2013.01)

(58) Field of Classification Search
CPC ..... G06F 8/51; G06F 8/52; G06F 8/70; G06F 8/76
(Continued)

(56) References Cited

U.S. PATENT DOCUMENTS

| 7,412,430 B1 * | 8/2008 | Moore ..................... G06N 5/02 706/46 |
| 7,774,757 B1 * | 8/2010 | Awasthi ................ G06F 11/366 709/203 |

(Continued)

FOREIGN PATENT DOCUMENTS

CN 106610836 5/2017

OTHER PUBLICATIONS

Rama, G. M., A Desiderata for Refactoring-Based Software Modularity Improvement, Proceedings of the 3rd India software engineering conference, Feb. 25-27, 2010, pp. 93-102, [retrieved on Feb. 27, 2019], Retrieved from the Internet.*

(Continued)

*Primary Examiner* — Geoffrey R St Leger
(74) *Attorney, Agent, or Firm* — Finnegan, Henderson, Farabow, Garrett & Dunner, LLP

(57) ABSTRACT

The present disclosure discloses method and application migration server for migration of monolithic enterprise applications to microservice architecture. The application migration server receives metadata information associated with monolithic application from users related with monolithic application and obtains artefacts associated with monolithic application, from repository of monolithic application. Based on metadata information and artefacts, application migration server generates master data for monolithic application, where master data lists plurality of modules associated with monolithic application. The application migration server classifies plurality of modules into one of first level degree modules, second level degree modules, and third level degree modules, based on modularity of source code and bundling of monolithic application, obtained from master data and performs migration of one or more modules, classified as first level degree modules to microservice architecture. The present disclosure helps in digital trans- (Continued)

formation of enterprise by providing road map for applications to be migrated to microservices architecture.

20 Claims, 9 Drawing Sheets

(58) Field of Classification Search
USPC .................................................. 717/120, 136
See application file for complete search history.

(56) References Cited

U.S. PATENT DOCUMENTS

| | | | | |
|---|---|---|---|---|
| 8,074,201 | B2* | 12/2011 | Ghercioiu | G06F 8/61 |
| | | | | 717/100 |
| 8,713,513 | B2* | 4/2014 | Sarkar | G06F 8/10 |
| | | | | 705/7.38 |
| 9,804,789 | B2* | 10/2017 | Uriel | G06F 3/0616 |
| 2006/0235899 | A1* | 10/2006 | Tucker | G06F 16/214 |
| 2008/0155508 | A1* | 6/2008 | Sarkar | G06F 8/10 |
| | | | | 717/126 |
| 2010/0070948 | A1* | 3/2010 | Rama | G06F 8/72 |
| | | | | 717/105 |
| 2013/0145347 | A1* | 6/2013 | Karr | G06F 8/75 |
| | | | | 717/113 |
| 2014/0282456 | A1* | 9/2014 | Drost | G06F 8/76 |
| | | | | 717/158 |
| 2015/0089063 | A1* | 3/2015 | Soni | H04L 47/70 |
| | | | | 709/226 |
| 2016/0124742 | A1 | 5/2016 | Rangasamy et al. | |
| 2016/0378361 | A1* | 12/2016 | Uriel | G06F 3/0616 |
| | | | | 718/1 |
| 2018/0131764 | A1* | 5/2018 | Suter | H04L 67/1097 |
| 2018/0365008 | A1* | 12/2018 | Chandramouli | G06F 8/76 |
| 2019/0108067 | A1* | 4/2019 | Ishikawa | H04L 41/5041 |

OTHER PUBLICATIONS

Kecskemeti, G., et al., The ENTICE Approach to Decompose Monolithic Services into Microservices, International Conference on High Performance Computing & Simulation (HPCS), Jul. 18-22, 2016, pp. 591-596, [retrieved on Nov. 18, 2019], Retrieved from the Internet.*
Amaral, M. et, "Performance Evaluation of Microservices Architectures using Containers", *IEEE*, (2015), pp. 1-9.
Bryant, D., "Microservice Maturity Model Proposal", 2015, pp. 1-3.

* cited by examiner

METHOD AND SYSTEM FOR MIGRATING MONOLITHIC ENTERPRISE APPLICATIONS TO MICROSERVICE ARCHITECTURE

TECHNICAL FIELD

The present subject matter is related in general to the field of application migration, more particularly, but not exclusively to method and system for migrating monolithic enterprise applications to microservice architecture.

BACKGROUND

Today enterprises have awakened to digital revolution and are working hard to become part of digital-centric mobile world. One of the key ways for the enterprises to be a successful digital enterprise is to adopt digital ways of working and identify an architecture which augers well for a digital enterprise. One such architecture which is widely used in the market today is microservice architecture.

Generally, traditional monolithic applications are hindering growth of the enterprises by not being responsive to customer needs, not being flexible to changes to capitalize on the opportunities provided by the market forces and not being very conducive for automation opportunities. Microservices is one the ways to realize the architecture for a digital enterprise that promises encapsulation, interoperability, and scalability in a secure manner. Microservices is seen as one of the ways for an enterprise to become truly digital as microservices is a preferred way of realizing the architecture. Many enterprises today are keen to adopt microservices, few are realizing benefits and hulk of them failing. To migrate from monolithic application architecture to microservices architecture, there is a need to check the maturity level of monolithic applications, which confirms with micro services architecture. Currently, the existing technologies do not provide a tool for checking the maturity level of the monolithic architecture. There are also hindrances in switching from monolithic application architecture to micro services architecture.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for migrating monolithic enterprise applications to microservice architecture. The method comprises receiving metadata information associated with a monolithic application of an enterprise, from one or more users related with the monolithic application, obtaining artefacts associated with the monolithic application, from a repository of the monolithic application, generating a master data for the monolithic application based on the metadata information and the artefacts. The master data lists a plurality of modules associated with the monolithic application. The method comprises classifying the plurality of modules into one of first level degree modules, second level degree modules, and third level degree modules, based on modularity of source code and bundling of the application, obtained from the master data of the application and performing migration of one or more modules of the plurality of modules, classified as the first level degree modules to microservice architecture.

In an embodiment, the present disclosure may relate to an application migration server for migrating monolithic enterprise applications to microservice architecture. The application migration server may comprise a processor and a memory communicatively coupled to the processor, where the memory stores processor executable instructions, which, on execution, may cause the application migration server to receive metadata information associated with a monolithic application of an enterprise, from one or more users related with the monolithic application, obtain artefacts associated with the monolithic application, from a repository of the monolithic application, generate a master data for the monolithic application based on the metadata information and the artefacts. The master data lists a plurality of modules associated with the monolithic application. The application migration server classifies the plurality of modules into one of first level degree modules, second level degree modules, and third level degree modules, based on modularity of source code and bundling of the application, obtained from the master data of the application and performs migration of one or more modules of the plurality of modules, classified as the first level degree modules to microservice architecture.

In an embodiment, the present disclosure relates to a non-transitory computer readable medium including instructions stored thereon that when processed by at least one processor may cause an application migration server to receive metadata information associated with a monolithic application of an enterprise, from one or more users related with the monolithic application, obtain artefacts associated with the monolithic application, from a repository of the monolithic application, generate a master data for the monolithic application based on the metadata information and the artefacts. The master data lists a plurality of modules associated with the monolithic application. The instructions cause the processor to classify the plurality of modules into one of first level degree modules, second level degree modules, and third level degree modules, based on modularity of source code and bundling of the application, obtained from the master data of the application and perform migration of one or more modules of the plurality of modules, classified as the first level degree modules to microservice architecture.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
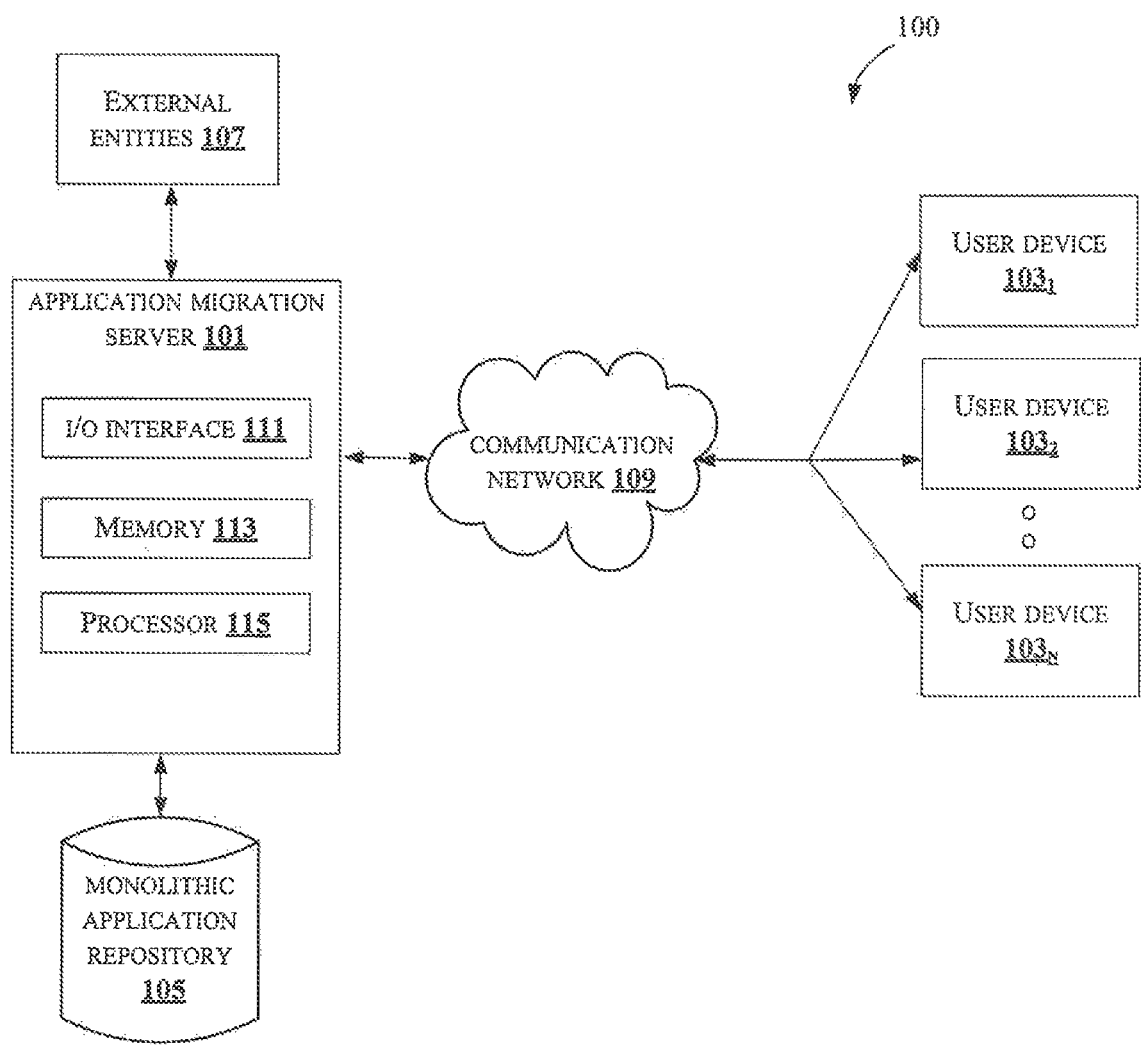
FIG. 1 illustrates an exemplary environment for migrating monolithic enterprise applications to microservice architecture in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and an application migration server for migrating monolithic enterprise applications to microservice architecture. The application migration server may receive metadata information and artefacts associated with a monolithic application, which requires to be migrated. The artefacts and the metadata information of the monolithic application may be analyzed to generate a master data for the monolithic application. In an embodiment, the master data lists the different modules associated with the monolithic application. Degree to which the monolithic application confirms to microservices architecture may be determined by classifying the different modules into one of first level degree, second level degree and third level degree. The modules associated with the first level degree may be migrated to microservice architecture. In an embodiment, a roadmap may be provided to the first level degree modules for migrating to microservice architecture. The present disclosure ensures an automated technique for migrating monolithic applications and provides an understanding of the degree to which the monolithic application confirms to microservice architecture.

FIG. 1 illustrates an exemplary environment for migrating monolithic enterprise applications to microservice architecture in accordance with some embodiments of the present disclosure.

As shown in FIG. 1, the environment 100 comprises an application migration server 101 connected through a communication network 109 to a user device $103_1$, a user device $103_2$, . . . and a user device $103_N$ (collectively referred as user devices 103) associated with users of a monolithic application. Further, the application migration server 101 is connected to a monolithic application repository 105 and external entities 107. In an embodiment, the external entities 107 may refer to organizations defining standards for an enterprise. The monolithic application repository 105 may store details such as, artefacts associated with the monolithic application of the enterprise. In an embodiment, the monolithic application may refer to a single-tiered software application in which user interfaces and data access code are combined into a single program from a single platform. In an embodiment, the user devices 103 may include, but are not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used in the present disclosure. Further, the communication network 109 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The application migration server 101 migrates the monolithic application of the enterprise to microservice architecture. The application migration server 101 may receive metadata information from the users, whenever a request to migrate a monolithic application to microservice architecture is received from the enterprise. In an embodiment, the application migration server 101 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used as application migration server 101 in the present disclosure. In an embodiment, the metadata information may be gathered by surveying users involved in development of the monolithic application. In an embodiment, the metadata information may comprise requirement details being addressed by the monolithic application, industry vertical and domains details associated with the monolithic application. A person skilled in the art would understand that any other metadata information, associated with the monolithic application, not mentioned explicitly, may also be received in the present disclosure. Further, the application migration server 101 may obtain artefacts associated with the monolithic application from the monolithic application repository 105. In an embodiment, the artefacts comprise source code of the monolithic application, business logic, architecture documents and requirement document associated with the monolithic application. A person skilled in the art would understand that any other information associated with the monolithic application may be obtained in the present disclosure.

Based on the artefacts and metadata information, the application migration server 101 generates master data associated with the monolithic application. In an embodiment, the master data may be a tree structure which includes, but is not limited to, enterprise framework and components detail of the monolithic application, list of modules and sub-modules of the monolithic application and dependencies between each module, business functionalities and third-party solutions associated with the monolithic application. Further, the application migration server 101 may classify the plurality of modules identified from the master data into one of a first level degree, a second level degree and a third level degree based on modularity of source code and bundling of the monolithic application, obtained from the master data. In an embodiment, the application migration server 101 may identify a plurality of domains for each of the plurality of modules based on master data and type of solutions provided by the plurality of modules. In an embodiment, modules from the plurality of modules associated with the first level degree are capable of being automatically migrated to the microservice architecture. In an embodiment, modules associated with second level degree may require one or more corrections in framework to comply with the microservice architecture. In an embodiment, modules associated with third level degree may be discarded and rewritten based on the microservice architecture. The application migration server 101 automatically migrates one or more modules classified as the first level degree to the microservice architecture. In an embodiment, the application migration server 101 may provide recommendation on at least one of, open source tools required for migration of the monolithic application, security recommendations and report on vulnerability of the source code, one or more metrics for the plurality of modules, one or more changes required in artefacts, architectural diagrams and test cases associated with modules of the first level degree for migrating to microservice architecture. In an embodiment, the application migration server 101 may optimize the migration of the one or more modules by learning based on previously migrated modules and by collaborating with external entities 107. In an embodiment, the application migration server 101 may provide details of refactoring needed to comply with microservice architecture for the one or more modules. In an embodiment, refactoring refers to reusing of code that already exists.

The application migration server 101 may include an I/O Interface 111, a memory 113 and a processor 115. The I/O interface 111 may be configured to receive the metadata information from the one or more users. The I/O interface 111 may receive the artefacts associated with the monolithic application from the monolithic application repository 105.

The information received from the I/O interface 111 may be stored in the memory 113. The memory 113 may be communicatively coupled to the processor 115 of the application migration server 101. The memory 113 may also store processor instructions which may cause the processor 115 to execute the instructions for migrating monolithic enterprise applications to microservice architecture.

Figure 2A:
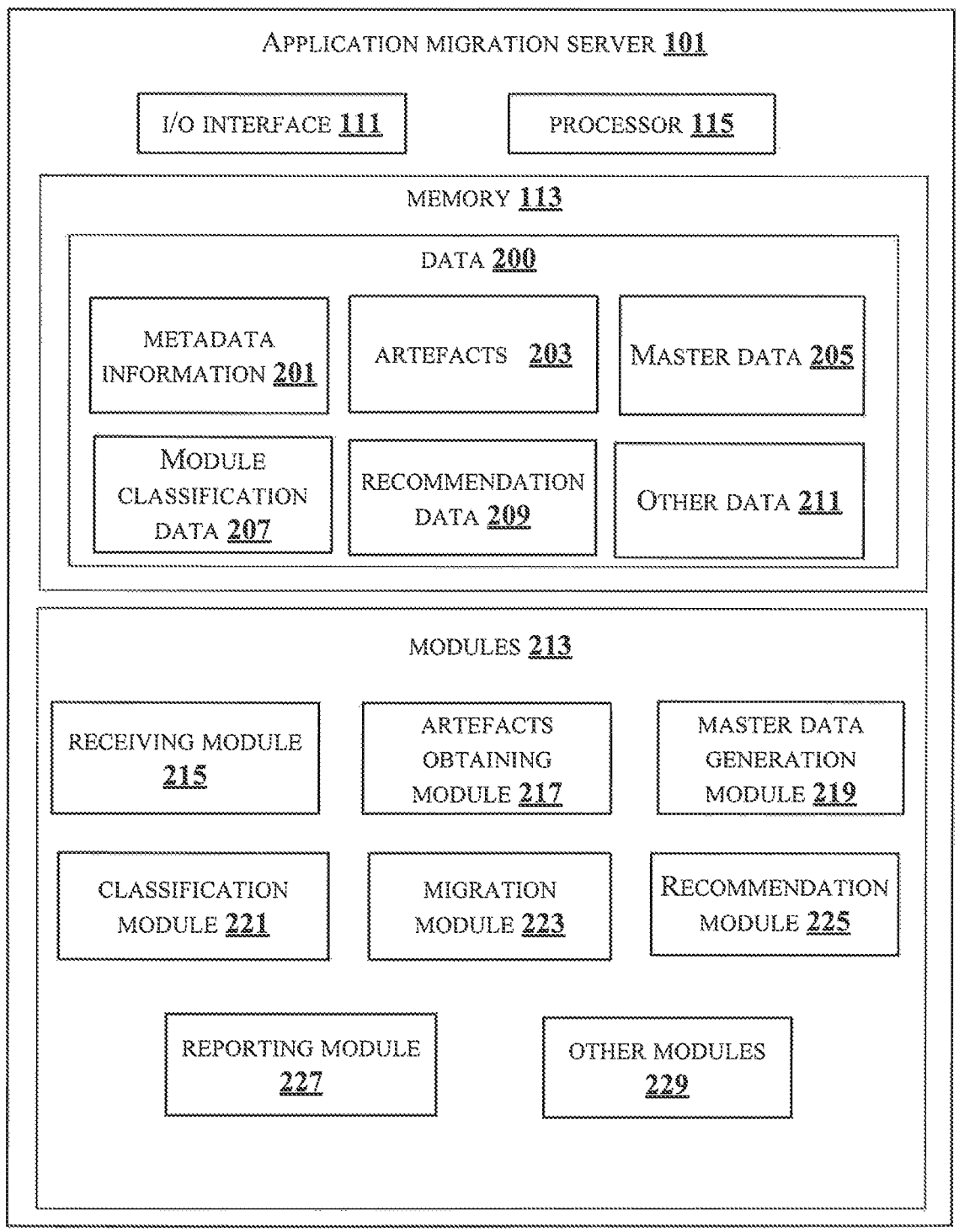
FIG. 2a shows a detailed block diagram of an application migration server in accordance with some embodiments of the present disclosure.

FIG. 2a shows a detailed block diagram of an application migration server in accordance with some embodiments of the present disclosure.

Data 200 and one or more modules 213 of the application migration server 101 are described herein in detail. In an embodiment, the data 200 may include metadata information 201, artefacts 203, master data 205, module classification data 207, recommendation data 209 and other data 211.

The metadata information 201 may include details associated with the monolithic application. The metadata information 201 may be gathered from the users involved in the development of the monolithic application such as, software developers, architects, administrators, and the like. In an embodiment, the metadata information may be obtained for any type of the monolithic application written in languages such as, Java, dot Net, Hypertext Pre-processor (PHP) etc. In an embodiment, new technology and programming languages may be supported as and when there are advancements. The metadata information may include requirement details being addressed by the monolithic application, industry vertical and domains details associated with the monolithic application.

The artefacts 203 may include various methods and processes built during development of the monolithic application. In an embodiment, the artefacts 203 may include, but is not limited to, requirement details, source code, business logic, architecture documents, design documents, test documents associated with the monolithic application.

The master data 205 may represent a tree structure associated with the monolithic application. The master data 205 may include enterprise framework and component details of the monolithic application, list of modules and sub-modules of the monolithic application and dependencies between each module, business functionalities and third-party solutions associated with the monolithic application.

The module classification data 207 may include list of modules classified into different type of degree level. The module classification data 207 may include information about modules associated with the first-degree level, the second-degree level and the third-degree level.

Recommendation data 209 may include recommendation details for migrating modules of the monolithic application. The recommendation data 209 may include information on open source tools required for migration of the monolithic application, security recommendations and report on vulnerability of the source code, metrics for the plurality of modules, one or more changes required in artefacts, architectural diagrams and test cases associated with the first level degree modules for migrating to microservice architecture.

The other data 211 may store data, including temporary data and temporary files, generated by modules 213 for performing the various functions of the application migration server 101.

In an embodiment, the data 200 in the memory 113 are processed by the one or more modules 213 of the application migration server 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 213 when configured with the functionality defined in the present disclosure will result in a novel hardware.

In one implementation, the one or more modules 213 may include, but are not limited to a receiving module 215, artefacts obtaining module 217, a master data generation module 219, a classification module 221, a migration module 223, a recommendation module 225 and a reporting module 227. The one or more modules 213 may also include other modules 229 to perform various miscellaneous functionalities of the application migration server 101. In an embodiment, the other modules 229 may include a domain identification module for identifying one or more domains associated with each of the modules based on the master data and type of solutions provided by the plurality of modules and a learning module for constantly learning based on previously migrated monolithic applications and by collaborating with the external entities 107.

The receiving module 215 may receive the metadata information associated with the monolithic application from the user devices 103 associated with the users. In an embodiment, the users involved in the development of the monolithic application may be provided with survey questions. In an embodiment, typical survey questions may be for example, "provide description of the monolithic application", "provide use cases and break down of the monolithic application along with dependent use cases", "provide details of any third-party programs used to achieve the objective along with the need for such a program".

The artefacts obtaining module 217 may obtain the artefacts associated with the monolithic application from the monolithic application repository 105. The artefacts obtaining module 217 may access the monolithic application repository 105 and obtain the artefact associated with the monolithic application.

Figure 2B:
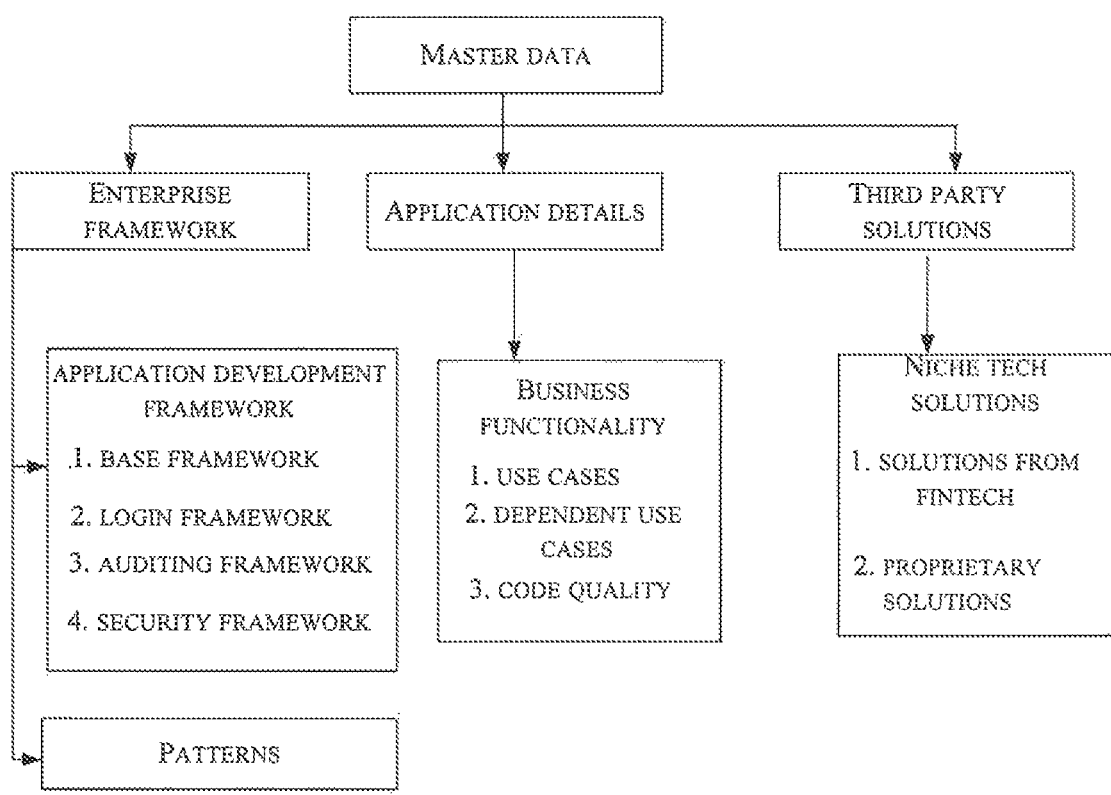
FIG. 2b shows an exemplary master data tree structure for a monolithic application in accordance with some embodiments of the present disclosure.

The master data generation module 219 may generate the master data for the monolithic application. The master data generation module 219 analyses the metadata information and the artefacts associated with the monolithic application to generate the master data. In an embodiment, the master data may be in the form of a tree structure that lists enterprise framework and component details of the monolithic application, list of modules and sub-modules, dependencies between each module, business functionalities and third-party solutions associated with the monolithic application. An exemplary master data tree structure is shown in FIG. 2b. In an embodiment, the master data generation module 219 may generate the master data by connecting to an application repository associated with the monolithic application and extracting information from key files such as, application.xml, and the like. In an embodiment, the master data generation module 219 may connect to a directory structure in the application repository and may locate a library folder where all files are stored. Based on the names of the files, the master data generation module 219 may identify the framework or modules used for logging, auditing and others. Further, the master data generation module 219 may determine use cases and dependencies along with artefacts that are used to realize the use cases using the master data and the information provided by users.

The classification module 221 may classify the plurality of modules associated with the monolithic application into one of the first level degree, the second level degree and the third level degree based on modularity of the source code and bundling of the monolithic application, obtained from the master data. The first level degree modules may be capable of being automatically migrated to the microservice architecture. For example, if the source code is modular and self-contained, and implemented code follows domain naming standards, the modules associated with the source code may be classified as first level degree module. The second level degree modules require one or more corrections in framework to comply with the microservice architecture. For example, the modules which comply with architecture principles of microservice architecture but does not follow domain grouping may be classified as second level degree module. The third level degree modules are to be discarded and rewritten based on the microservice architecture. For example, the modules which are non-conformant with industry standard micro service architecture principles are classified as third level degree modules.

The migration module 223 may migrate the one or more modules which are classified as the first level degree modules. The migration module 223 may obtain the source code of the monolithic application and extract and regroup the source code separately for each first level degree module. For example, in a retail banking application, the modules which are classified as first level degree modules may include accounts, customer management, notification, payments, assisted banking, and insurance management. The migration module 223 may regroup the source code of each of these modules as an individual microservice. In an embodiment, the migration module 223 may classify the plurality of modules into a plurality of domains, based on the master data and type of solutions provided by the plurality of modules. The migration module 223 may refer to a template database for classifying the plurality of modules based on domains. For example, if the monolithic application is a retail banking application and modules include accounts and customer, then some accounts (sub modules) under the accounts module may be classified into savings accounts domain and some modules may be classified into current accounts domain. The classification of modules and sub modules into different domains may enable provision of retail banking resources to be provided to savings account and current accounts on a need basis to address needs seamlessly.

The recommendation module 225 may provide recommendation for migrating the one or more modules of the monolithic application to microservice architecture. The recommendation module 225 provides recommendation on at least one of open source tools required for migration of the monolithic application, security recommendations and report on vulnerability of the source code, one or more metrics for the plurality of modules, one or more changes required in artefacts, architectural diagrams and test cases associated with the first level degree modules for migrating to microservice architecture. In an embodiment, the one or more metrics comprises a roadmap for migrating the first level degree modules to microservice architecture. The roadmap may include steps such as, complying with interface requirements, self-contained and other microservices principles. Further, the one or more metrics include technical debt indicating correction required for the second level degree modules based on industry standard productivity, evaluation on applicability of the plurality of modules to be stored on a server and evaluating changes required for test cases of the plurality of modules.

Figure 2C:
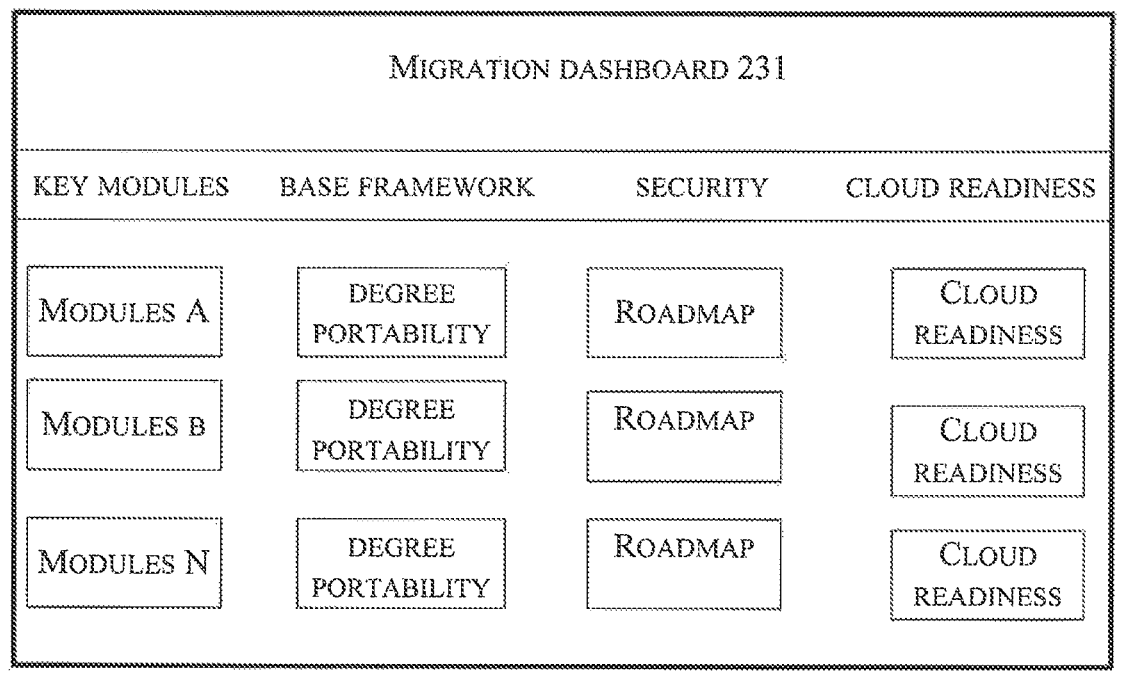
FIG. 2c shows an exemplary migration dashboard of an application migration server in accordance with some embodiments of the present disclosure.

The reporting module 227 may provide a detailed report for each module of the monolithic application, highlighting the road map in terms of alignment need for domains, encapsulation, interoperability, security, and others as needed for enterprise applications. FIG. 2c shows an exemplary migration dashboard of the application migration server 101. The migration dashboard displays each modules of the monolithic application along with degree of portability, roadmap, and readiness to server.

Figure 3A:
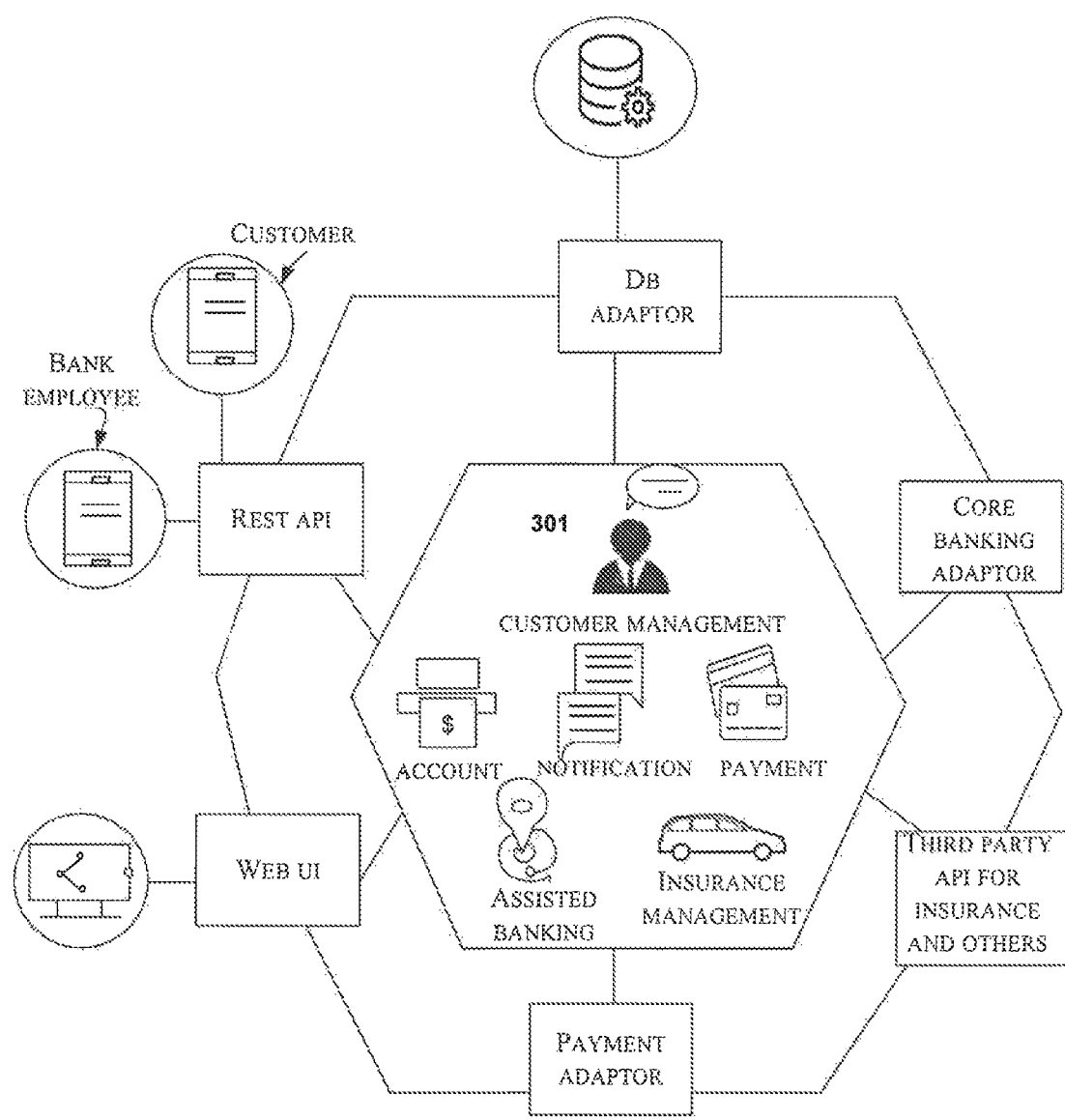
FIG. 3a and FIG. 3b show exemplary representations of migrating a monolithic banking application to microservice architecture in accordance with some embodiments of the present disclosure.
Figure 3B:
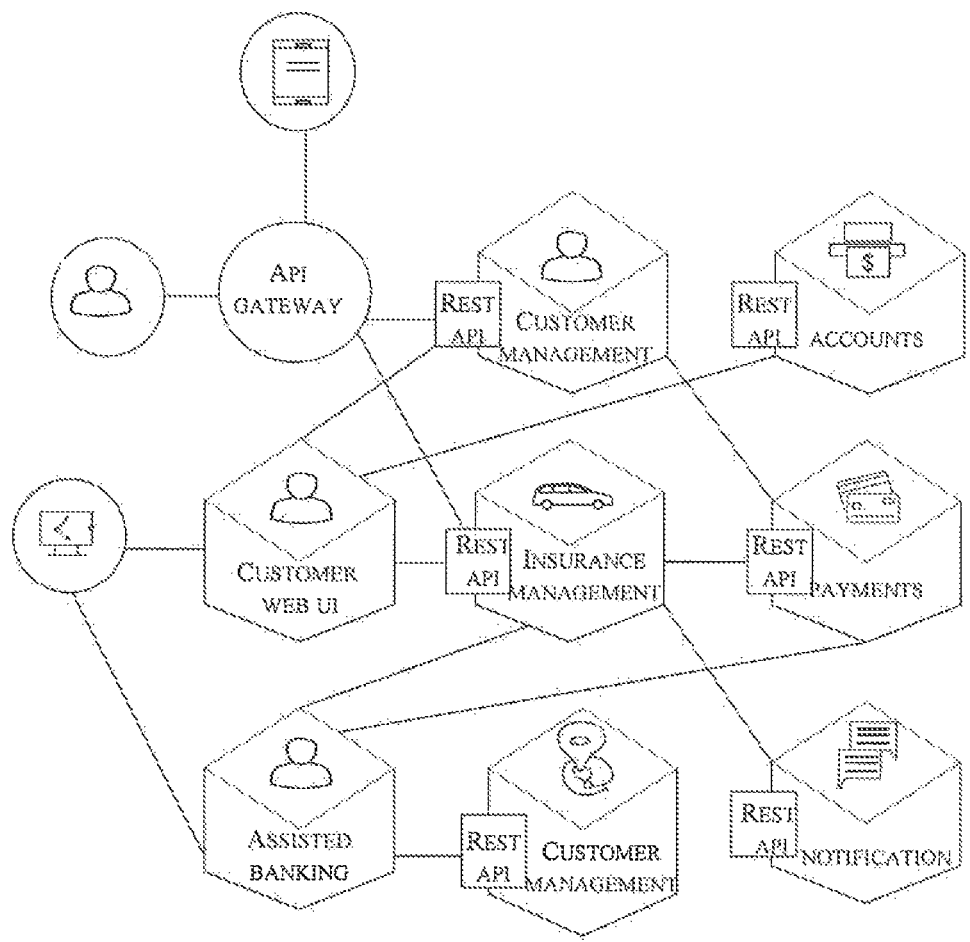

FIG. 3a and FIG. 3b show exemplary representations of migrating a monolithic retail banking application to microservice application in accordance with some embodiments of the present disclosure.

FIG. 3a illustrates an exemplary embodiment of a retail banking application. In an embodiment, the retail banking application may be used by end users for self-service as well as by bank employees for assisted banking. The retail banking application consists of a business logic 301 at the core of the banking application, which may be implemented by modules that define services, domain objects, and events. Further, surrounding the core business logic 301 are one or more adaptors such as, database adaptor, core banking adaptor which connects with core banking solution of retail banking application, rest Application Programming Interface (API), web User Interface (UI), payment adaptor, third party API for insurance etc., for interfacing with external world. In an embodiment, the retail banking application is packaged and deployed as a monolithic application. In such case, to migrate the retail banking application, the application migration server 101 may initially receive the metadata information associated with the retail banking application from the users involved in the development of the retail banking application. Further, artefacts associated with the retail banking application may be obtained from a repository of the retail banking application. To migrate the retail banking application, each functional area of the retail banking application such as, accounts, customer management etc., is to be implemented by its own microservice. From the obtained artefacts of the retail banking application, the application migration server 101 may take the source code of the retail banking application and regroup them as code related to customer management, account management, payments for self-service needs of end customers as well as provide functionality for banking employees who provides assisted banking. Also, details related to customers, accounts, payments, assisted banking are analysed and grouped into different folders to identify one or more modules of the retail banking application. The identified one or more modules comprises customer management, accounts, insurance management, payment, notifications, assisted banking, and the like. Further, the application migration server 101 may classify the one or modules into one of first level degree modules, second level degree modules and third level degree modules based on modularity of source code and bundling of the retail banking application. For example, the application migration server 101 classifies the customer management module, account management module, insurance management module, payment management module, notification management module and assisted banking module as first level degree modules, since these modules are self-contained, modular and contain clear defined interfaces. The application migration server 101 performs migration of the customer management module, account management module, insurance management module, payment management module, notification management module and assisted banking module to a microservice architecture as shown in FIG. 3b.

Figure 3C:
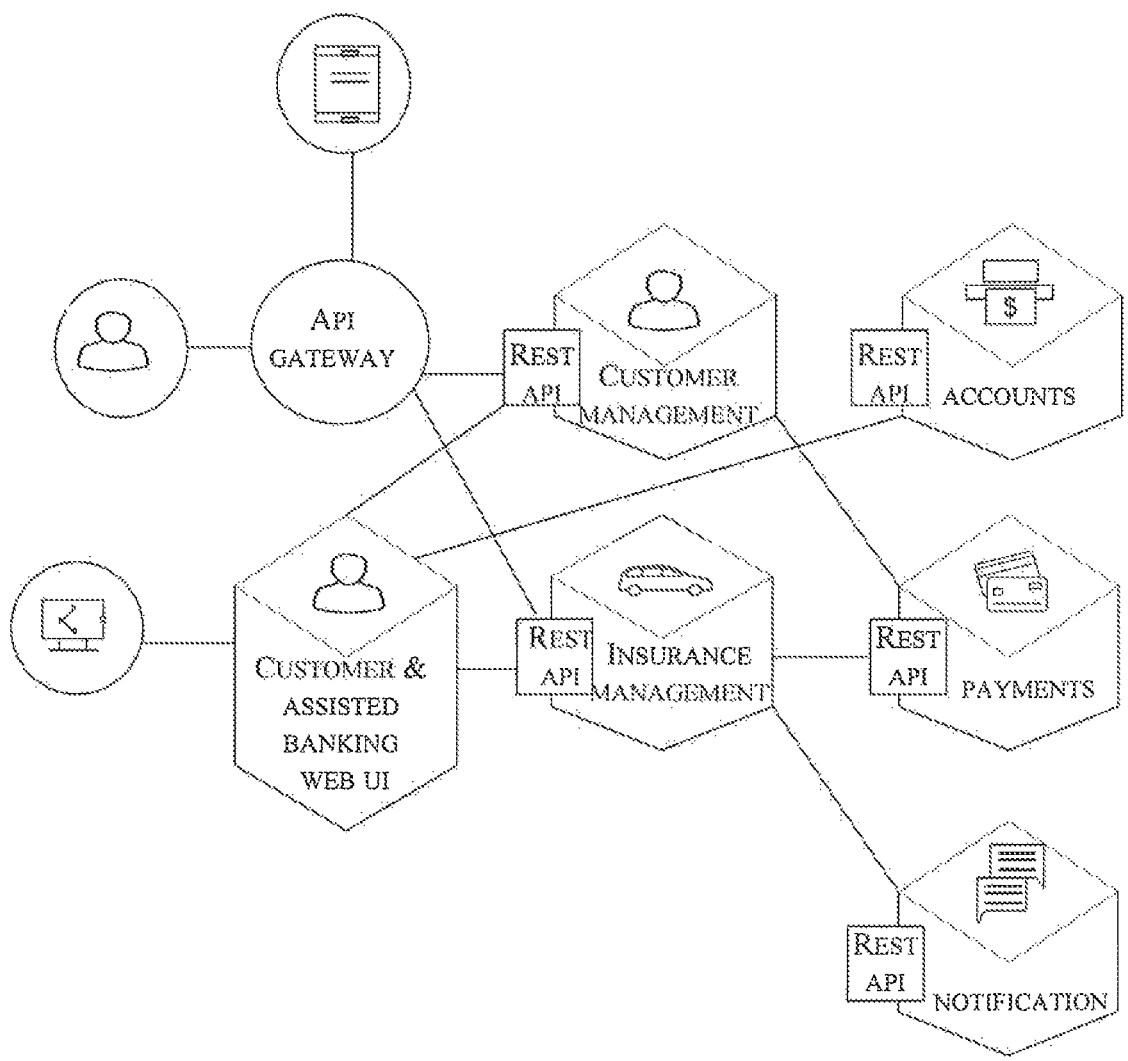
FIG. 3c shows an exemplary representation of modules of second level degree in accordance with some embodiments of the present disclosure.

In an embodiment, the application migration server 101 may classify the one or more modules of the retail banking application into second level degree modules, when the modules require corrections in framework to comply with the microservice architecture. For example, the one or more modules may be classified as second level degree modules, when multiple services are bundled together into modules, user interfaces are common across these modules, making it difficult to independently manage the modules and if there is no clear separation between functionalities. FIG. 3c shows an exemplary representation of modules of second level degree in accordance with some embodiment of the present disclosure. As shown in FIG. 3c, the customer web UI and assisted banking functionalities has no separation. Thus, the application migration server 101 may classify the customer web UI and assisted banking under second level degree modules. In an embodiment, the application migration server 101 may classify the one or more modules of the retail banking application into third level degree modules, when the modules are to be discarded and rewritten based on the microservice architecture.

Figure 4:
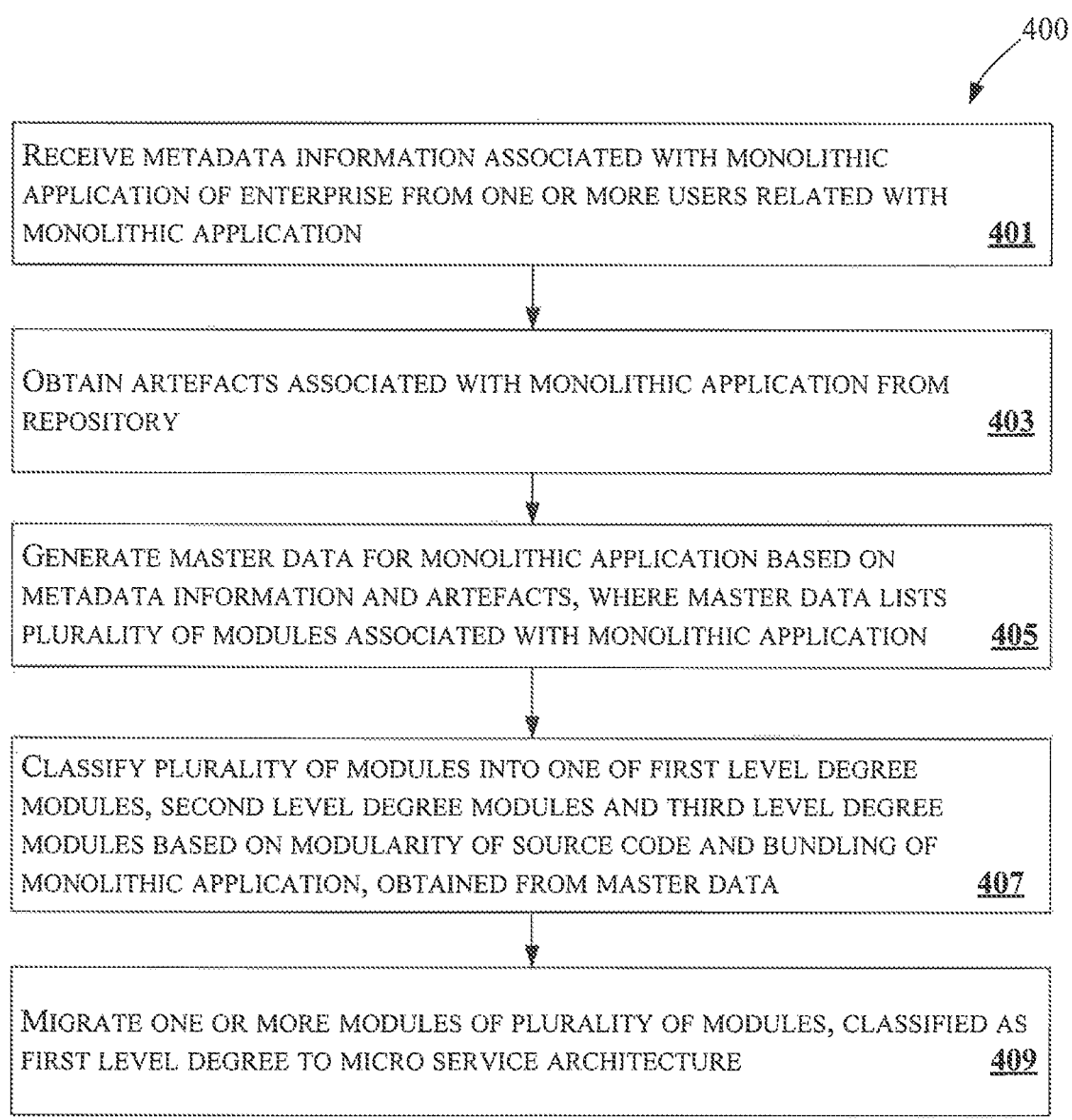
FIG. 4 illustrates a flowchart showing a method for migrating monolithic enterprise applications to microservice architecture in accordance with some embodiments of present disclosure.

FIG. 4 illustrates a flowchart showing a method for migrating monolithic enterprise applications to microservice application in accordance with some embodiments of present disclosure.

As illustrated in FIG. 4, the method 400 includes one or more blocks for migrating a monolithic banking application to microservice application. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the metadata information associated with the monolithic application of the enterprise may be received, by the receiving module 215. The metadata information may be received from one or more users related with the monolithic application.

At block 403, the artefacts associated with the monolithic application may be obtained, by the artefacts obtaining module 217, from the monolithic application repository 105.

At block 405, the master data for the monolithic application may be generated, by the master data generation module 219, based on the metadata information and the artefacts. The master data lists the plurality of modules associated with the monolithic application.

At block 407, the plurality of modules may be classified, by the classification module 221, into one of the first level degree modules, the second level degree modules, and the third level degree modules based on the modularity of source code and bundling of the monolithic application, obtained from the master data.

At block 409, the one or more module classified as the first level degree modules may be migrated, by the migration module 223, to microservice architecture.

Figure 5:
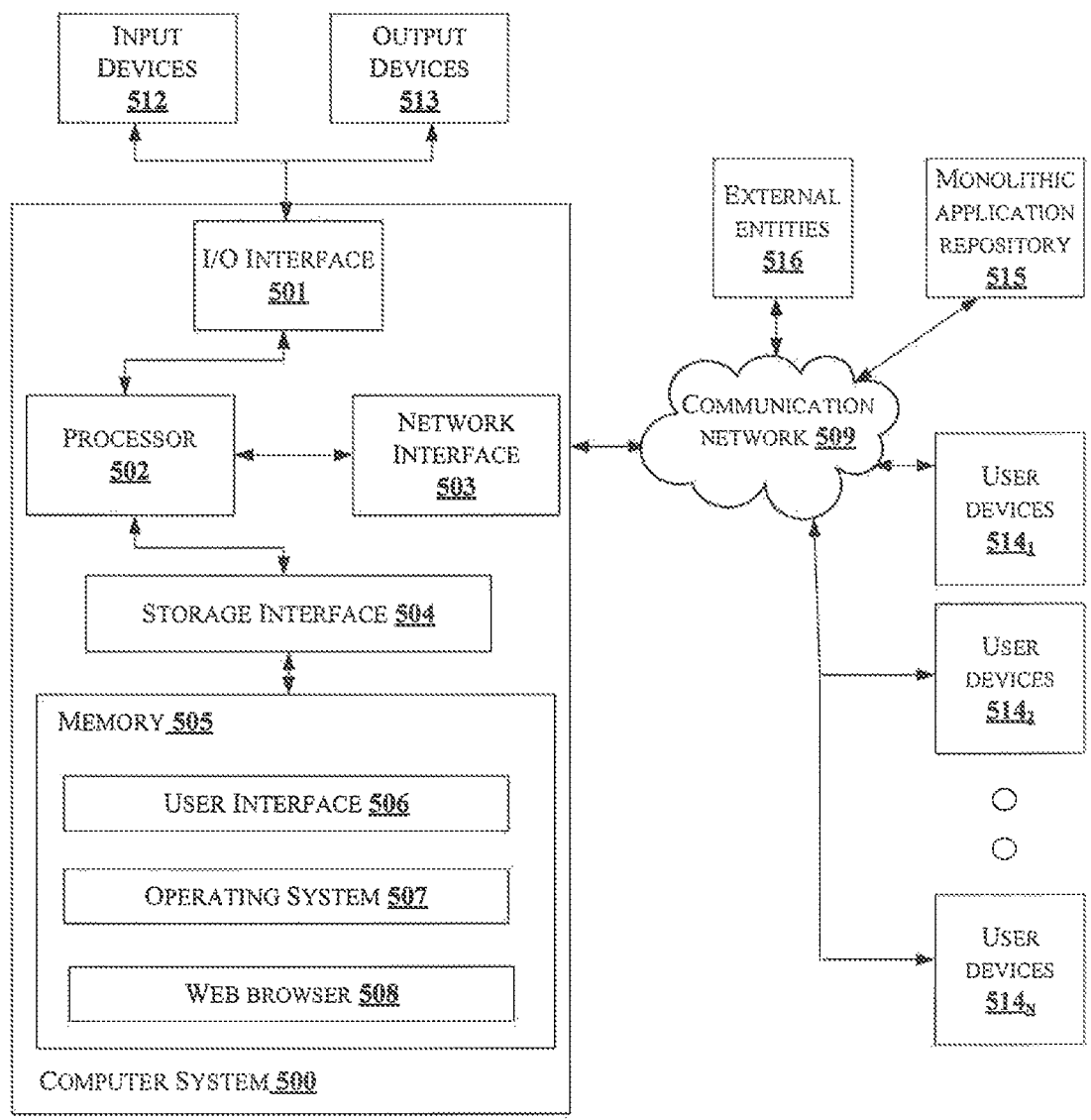
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the application migration server 101. The computer system 500 may include a central processing unit ("CPU" or "processor") 502. The processor 502 may include at least one data processor for migrating monolithic enterprise applications to microservice architecture. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1.394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the application migration server 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device 514$_1$, a user device 514$_2$ . . . and a user device 514$_N$, a monolithic application repository 515 and external entities 516. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such.

The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREED™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure migrates monolithic enterprise application to microservice architecture.

The present disclosure helps in digital transformation journey of an enterprise by providing a road map for applications to be migrated to microservices architecture, thereby being conducive for change, responsive for customer needs and opening up opportunities for automation.

An embodiment of the present disclosure provides easy maintenance of the migrated application.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Application migration server |
| 103 | User devices |
| 105 | Monolithic application repository |
| 107 | External entities |
| 109 | Communication network |
| 111 | I/O interface |
| 113 | Memory |
| 115 | Processor |
| 200 | Data |
| 201 | Metadata information |
| 203 | artefacts |
| 205 | Master data |
| 207 | Classification module |
| 209 | Recommendation data |
| 211 | Other data |
| 213 | Modules |
| 215 | Receiving module |
| 217 | Artefacts obtaining module |
| 219 | Master data generation module |
| 221 | Classification module |
| 223 | Migration module |
| 225 | Recommendation module |
| 227 | Reporting module |
| 229 | Other modules |
| 301 | Business logic |
| 500 | Computer system |
| 501 | I/O interface |

-continued

| Reference Number | Description |
|---|---|
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | User devices |
| 515 | Monolithic application repository |
| 516 | External entities |

What is claimed is:

1. A method for migrating monolithic enterprise applications to a microservice architecture, the method comprising:
receiving, by an application migration server, metadata information associated with a monolithic application of an enterprise, from one or more users related with the monolithic application;
obtaining, by the application migration server, artefacts associated with the monolithic application, from a repository of the monolithic application;
generating, by the application migration server, a master data for the monolithic application based on the metadata information and the artefacts, wherein the master data lists includes a plurality of modules and business functionalities associated with the monolithic application;
determining, by the application migration server, a degree level to which the plurality of modules associated with the monolithic application conform to the microservice architecture based on modularity of source code of each module, separation between business functionalities of each module, and conformance of each module with architecture principles and industry standard of micro service architecture; and
performing, by the application migration server, migration of one or more modules of the plurality of modules to the microservice architecture based on the degree level of the plurality of modules.

2. The method as claimed in claim 1, wherein the metadata information comprises requirement details being addressed by the monolithic application, an industry vertical, and domains details associated with the monolithic application.

3. The method as claimed in claim 1, wherein the master data comprises enterprise framework and components detail of the monolithic application, list of modules, and sub-modules of the monolithic application and dependencies between each module, and third-party solutions associated with the monolithic application.

4. The method as claimed in claim 1, wherein the artefacts comprise source code of the monolithic application, business logic, architecture documents, and a requirement document associated with the monolithic application.

5. The method as claimed in claim 1, wherein the degree level of the plurality of modules includes first level degree modules that are capable of being automatically migrated to the microservice architecture.

6. The method as claimed in claim 1, wherein the degree level of the plurality of modules includes second level degree modules that require one or more corrections in framework to comply with the microservice architecture.

7. The method as claimed in claim 1, wherein the degree level of the plurality of modules includes third level degree modules that are to be discarded and rewritten based on the microservice architecture.

8. The method as claimed in claim 1 further comprising providing recommendation on at least one of, open source tools required for migration of the monolithic application, security recommendations and report on vulnerability of the source code, one or more metrics for the plurality of modules, one or more changes required in artefacts, architectural diagrams and test cases associated with the first level degree modules for migrating to the microservice architecture.

9. The method as claimed in claim 8, wherein the one or more metrics comprise a roadmap for migrating first level degree modules to the microservice architecture, technical debt indicating correction needed for second lever degree modules based on industry standard productivity, evaluation on applicability of the plurality of modules to be stored on a server, and evaluating changes required for test cases of the plurality of modules.

10. The method as claimed in claim 1, wherein the migration of the one or more modules comprises classifying the plurality of modules into a plurality of domains, based on the master data and type of solutions provided by the plurality of modules.

11. An application migration server for migrating enterprise applications to a microservice architecture, comprising:
a processor; and
a memory communicatively coupled to the processor, wherein the memory stores processor instructions, which, on execution cause the processor to:
receive metadata information associated with a monolithic application of an enterprise, from one or more users related with the monolithic application;
obtain artefacts associated with the monolithic application, from a repository of the monolithic application;
generate a master data for the monolithic application based on the metadata information and the artefacts, wherein the master data includes a plurality of modules and business functionalities associated with the monolithic application;
determine a degree level to which the plurality of modules associated with the monolithic application conform to the microservice architecture based on modularity of source code of each module, separation between business functionalities of each module, and conformance of each module with architecture principles and industry standard of micro service architecture; and
perform migration of one or more modules of the plurality of modules to the microservice architecture based on the degree level of the plurality of modules.

12. The application migration server as claimed in claim 11, wherein the metadata information comprises requirement details being addressed by the monolithic application, industry vertical, and domains details associated with the monolithic application.

13. The application migration server as claimed in claim 11, wherein the master data comprises enterprise framework and components detail of the monolithic application, list of modules and sub-modules of the monolithic application and dependencies between each module, and third-party solutions associated with the monolithic application.

14. The application migration server as claimed in claim 11, wherein the artefacts comprise source code of the monolithic application, business logic, architecture documents, and requirement documents associated with the monolithic application.

15. The application migration server as claimed in claim 11, wherein the degree level of the plurality of modules includes first level degree modules that are capable of being automatically migrated to the microservice architecture.

16. The application migration server as claimed in claim 11, wherein the degree level of the plurality of modules includes second level degree modules that require one or more corrections in framework to comply with the microservice architecture, and wherein the degree level of the plurality of modules further includes third level degree modules that are discarded and rewritten based on the microservice architecture.

17. The application migration server as claimed in claim 11, wherein the processor provides recommendation on at least one of, open source tools required for migration of the monolithic application, security recommendations, and report on vulnerability of the source code, one or more metrics for the plurality of modules, one or more changes required in artefacts, architecture diagram, and test cases associated with the first level degree modules for migrating to microservice architecture.

18. The application migration server as claimed in claim 17, wherein the one or more metrics comprise a roadmap for migrating first level degree modules to the microservice architecture, technical debt indicating correction needed for second level degree modules based on industry standard productivity, evaluation on applicability of the plurality of modules to be stored on a server and evaluating changes required for test cases of the plurality of modules.

19. The application migration server as claimed in claim 11, wherein the migration of the one or more modules comprises classifying the plurality of modules into a plurality of domains, based on the master data and type of solutions provided by the plurality of modules.

20. A non-transitory computer readable medium including instructions stored thereon that when processed by at least one processor cause an application migration server to perform operations comprising:

receiving metadata information associated with a monolithic application of an enterprise, from one or more users related with the monolithic application;

obtaining artefacts associated with the monolithic application, from a repository of the monolithic application;

generating a master data for the monolithic application based on the metadata information and the artefacts, wherein the master data lists includes a plurality of modules and business functionalities associated with the monolithic application;

determining a degree level to which the plurality of modules associated with the monolithic application conform to the microservice architecture based on modularity of source code of each module, separation between business functionalities of each module, and conformance of each module with architecture principles and industry standard of micro service architecture; and performing migration of one or more modules of the plurality of modules to the microservice architecture based on the degree level of the plurality of modules.

* * * * *